United States Patent
Jung et al.

(10) Patent No.: US 10,728,131 B2
(45) Date of Patent: Jul. 28, 2020

(54) TERMINAL AND COMMUNICATION METHOD THEREOF

(71) Applicant: Samsung Electronics Co., Ltd., Gyeonggi-do (KR)

(72) Inventors: Hakyung Jung, Seoul (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/592,053

(22) Filed: May 10, 2017

(65) Prior Publication Data

US 2017/0331715 A1 Nov. 16, 2017

(30) Foreign Application Priority Data

May 10, 2016 (KR) .......................... 10-2016-0056921

(51) Int. Cl.
| | | |
|---|---|---|
| *H04L 12/26* | (2006.01) | |
| *H04L 29/06* | (2006.01) | |
| *H04L 12/801* | (2013.01) | |
| *H04L 12/841* | (2013.01) | |
| *H04L 29/08* | (2006.01) | |

(52) U.S. Cl.
CPC ...... *H04L 43/0894* (2013.01); *H04L 43/0829* (2013.01); *H04L 43/0858* (2013.01); *H04L 43/0864* (2013.01); *H04L 47/193* (2013.01); *H04L 47/283* (2013.01); *H04L 47/37* (2013.01); *H04L 69/16* (2013.01); *H04L 69/163* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 7,609,640 B2 | 10/2009 | Ahuja et al. | |
| 9,178,789 B2 | 11/2015 | Zhang et al. | |
| 2003/0149715 A1* | 8/2003 | Ruutu ................... | H04L 29/06 718/100 |
| 2005/0036511 A1 | 2/2005 | Baratakke et al. | |
| 2007/0008884 A1 | 1/2007 | Tang | |
| 2009/0213850 A1* | 8/2009 | Viger ................... | H04L 47/10 370/389 |

(Continued)

FOREIGN PATENT DOCUMENTS

| | | |
|---|---|---|
| EP | 2086187 A1 | 8/2009 |
| WO | 2006056880 A2 | 6/2006 |
| WO | 2008099201 A1 | 8/2008 |

OTHER PUBLICATIONS

International Search Report for International Application No. PCT/KR2017/004807, dated Jul. 28, 2017. (3 pages).

(Continued)

*Primary Examiner* — Yaotang Wang

(57) ABSTRACT

The present disclosure relates to a terminal using and a communication method thereof. In the communication method, the terminal receives at least one data segment from a sender and transmits at least one acknowledgment (ACK) segment corresponding to the at least one data segment to the sender. In addition, the terminal transmits a predetermined number of optimistic ACK segments corresponding to data segments to be received to the sender. Other embodiments are also possible.

12 Claims, 11 Drawing Sheets

(56) References Cited

U.S. PATENT DOCUMENTS

2013/0138827 A1   5/2013  Loach
2013/0339543 A1   12/2013 Fall
2017/0026405 A1*  1/2017  Vengalil .............. H04L 63/1458

OTHER PUBLICATIONS

Stefan Savage et al., "TCP Congestion Control with a Misbehaving Receiver", ACM SIGCOM Computer Communication Review, vol. 29, No. 5, Oct. 1999. (9 pages).

F.A. Barbhuiya et al., "Application of stochastic discrete event system framework for detection of induced low rate TCP attack", ISA Transactions, vol. 58, Sep. 2015. (20 pages).

European Patent Office, "Supplementary European Search Report," Application No. EP 17796364.2, dated Jan. 15, 2019, 7 pages.

* cited by examiner

TERMINAL AND COMMUNICATION METHOD THEREOF

CROSS-REFERENCE TO RELATED APPLICATION AND CLAIM OF PRIORITY

The present application is related to and claim the benefit under 35 U.S.C. § 119(a) to Korean patent application serial number 10-2016-0056921 filed on May 10, 2016 in the Korean intellectual property office, the entire disclosure of which is hereby incorporated by reference.

TECHNICAL FIELD

The present disclosure relates to a terminal using a transmission control protocol (TCP) and a communication method thereof.

BACKGROUND

The transmission control protocol (TCP) may use a slow start algorithm which is a very conservative initial transmission rate determination scheme. The transmission rate of TCP protocol may be expressed by a congestion window (cwnd) which means the number of segments that can be sent every round trip time (RTT). In order to find a suitable transmission rate, the slow start algorithm may begin at a very small cwnd (e.g., less than 4 KB, RFC3390) at first and then double the cwnd every RTT. This step may be referred to as a slow start step, a slow start state, or a slow start section. Therefore, if a proper cwnd of the current network path is N, $\log_2 N$ RTTs may be needed to reach the proper cwnd by the slow start algorithm. In other words, this may mean that the proper cwnd is not reached until approximately 2N data segments are transmitted. When the current cwnd reaches a proper cwnd state, this may be referred to as a congestion avoidance step or a congestion avoidance state.

Meanwhile, according to various Internet measurement studies, about 99% of the current Internet traffic is less than 100 KB in the total size of a flow, and about 95% or more of all web objects may be less than 90 KB. This means that most TCP flows will stay in a slow start state of not reaching the optimal cwnd until the entire transmission is completed. Accordingly, many techniques have been proposed to improve the inefficiency of the TCP slow start step. Such techniques, however, have a lot of constraints on deployment such as a change of a TCP transmitter, a change of an intermediate router between a transmitter and a receiver, and the like, thus being rarely used in reality.

SUMMARY

To address the above-discussed deficiencies, it is a primary object to provide improved performance of a TCP slow start section without any change, addition or help of a TCP sender or an intermediate router at a TCP receiver so as to reduce a delay time experienced by a user and also increase a utilization rate of a network.

Another object of the present disclosure is to provide a TCP receiver and a control method thereof that can increase a transmission rate (cwnd) of a TCP sender.

Still another object of the present disclosure is to provide a method for allowing a TCP receiver to detect a loss situation of a data segment transmitted from a TCP sender, which may occur in case of intending to improve the performance of a TCP slow start section, so that the reliability of protocol can be maintained.

The objects of the present disclosure are not limited to the above-mentioned objects, and other objects not mentioned can be understood by those skilled in the art from the following description.

In order to accomplish the foregoing or other objects, a communication method of a terminal according to an embodiment of the present disclosure may include receiving at least one data segment from a sender; transmitting at least one acknowledgment (ACK) segment corresponding to the at least one data segment to the sender; and transmitting a predetermined number of optimistic ACK segments corresponding to data segments to be received to the sender.

In the method, the predetermined number may be equal to the number of data segments received in a current round trip time (RTT) round.

In the method, the transmitting a predetermined number of optimistic ACK segments may include, in case of a slow start state, transmitting the predetermined number of the optimistic ACK segments to the sender at the predetermined time.

In the method, the transmitting a predetermined number of optimistic ACK segments may include transmitting the predetermined number of the optimistic ACK segments to the sender at the predetermined time if a number of data segments received in a current round trip time (RTT) round is greater than or equal to a sum of a number of data segments received in a previous RTT round and a number of ACK segments transmitted in the previous RTT round.

In the method, the transmitting a predetermined number of optimistic ACK segments may include transmitting the predetermined number of the optimistic ACK segments to the sender at the predetermined time if an elapsed time of a current round trip time (RTT) round is smaller than a minimum one-way delay time.

In addition, the method may further include transmitting a retransmission request message for a non-received data segment to the sender if at least one data segment among the data segments corresponding to the predetermined number of the optimistic ACK segments is not received within a predetermined time.

In addition, the method may further include driving a loss detect timer if the data segments corresponding to the predetermined number of the optimistic ACK segments are not received in sequence; and transmitting to the sender a retransmission request message starting from a next data segment of normally received data segments if the data segments corresponding to the predetermined number of the optimistic ACK segments are not received in sequence until the loss detect timer expires.

In order to accomplish the foregoing or other objects, a terminal according to an embodiment of the present disclosure may include a communication unit configured to communicate with other device; and a controller configured to control at least one data segment to be received from a sender, to control at least one acknowledgment (ACK) segment corresponding to the at least one data segment to be transmitted to the sender, and to control a predetermined number of optimistic ACK segments, corresponding to data segments to be received, to be transmitted to the sender.

In the terminal, the controller may be further configured to control, in case of a slow start state, the predetermined number of the optimistic ACK segments to be transmitted to the sender at the predetermined time.

In the terminal, the controller may be further configured to control the predetermined number of the optimistic ACK segments to be transmitted to the sender at the predetermined time if a number of data segments received in a current round trip time (RTT) round is greater than or equal to a sum of a number of data segments received in a previous RTT round and a number of ACK segments transmitted in the previous RTT round.

In the terminal, the controller may be further configured to control the predetermined number of the optimistic ACK segments to be transmitted to the sender at the predetermined time if an elapsed time of a current round trip time (RTT) round is smaller than a minimum one-way delay time.

In the terminal, the controller may be further configured to control a retransmission request message for a non-received data segment to be transmitted to the sender if at least one data segment among the data segments corresponding to the predetermined number of the optimistic ACK segments is not received within a predetermined time.

In the terminal, the controller may be further configured to drive a loss detect timer if the data segments corresponding to the predetermined number of the optimistic ACK segments are not received in sequence, and to control a retransmission request message to be transmitted to the sender if the data segments corresponding to the predetermined number of the optimistic ACK segments are not received in sequence until the loss detect timer expires, wherein the retransmission request message starts from a next data segment of normally received data segments.

According to an embodiment of the present disclosure, a receiver can reduce a delay time experienced by a user and also increase a utilization rate of a network by increasing a transmission rate of a sender in a manner of previously sending an acknowledgment (ACK) segment before receiving at least one data segment transmitted by the sender, assuming that the at least one data segment will be successfully received.

According to another embodiment of the present disclosure, a receiver that has already sent an ACK segment on the assumption that at least one data segment of a sender would be successfully received detects a situation in which actually the data segment is lost, and requests the retransmission of the lost data segment, thereby maintaining the reliability of protocol.

The effects obtainable by the present disclosure are not limited to the above-mentioned effects, and other effects not mentioned can be clearly understood by those skilled in the art from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication systemdisclosure.

In the following description of the present disclosure, well known elements, functions, operations, techniques, etc. may not be described or illustrated in detail to avoid obscuring the subject matter of the present disclosure.

In this disclosure, when it is stated that a certain element is "coupled to" or "connected to" another element, such elements may be electrically, physically or logically coupled to or connected to each other. Also, both elements may be directly coupled or connected to each other, or a new element may exist between both elements.

Elements shown in embodiments of this disclosure are used independently to represent different characteristic functions and do not necessarily mean that each element is composed of separate hardware or one software unit. Namely, respective elements are used exemplarily for convenience of description, and at least two elements may be integrated into one element, or one element may be divided logically or physically into a plurality of elements to perform similar or different functions. Any case is also included within the scope of the present disclosure, without departing from the essence of the present disclosure.

Some of elements used herein may not be essential for the present disclosure, but may be optional elements only to improve performance. This disclosure may be implemented with essential elements only or by further including optional elements.

In this disclosure, terms are defined in consideration of functions of this disclosure and may be varied depending on user or operator's intention or custom. Therefore, the definition should be made based on the contents throughout this description.

Figure 1:
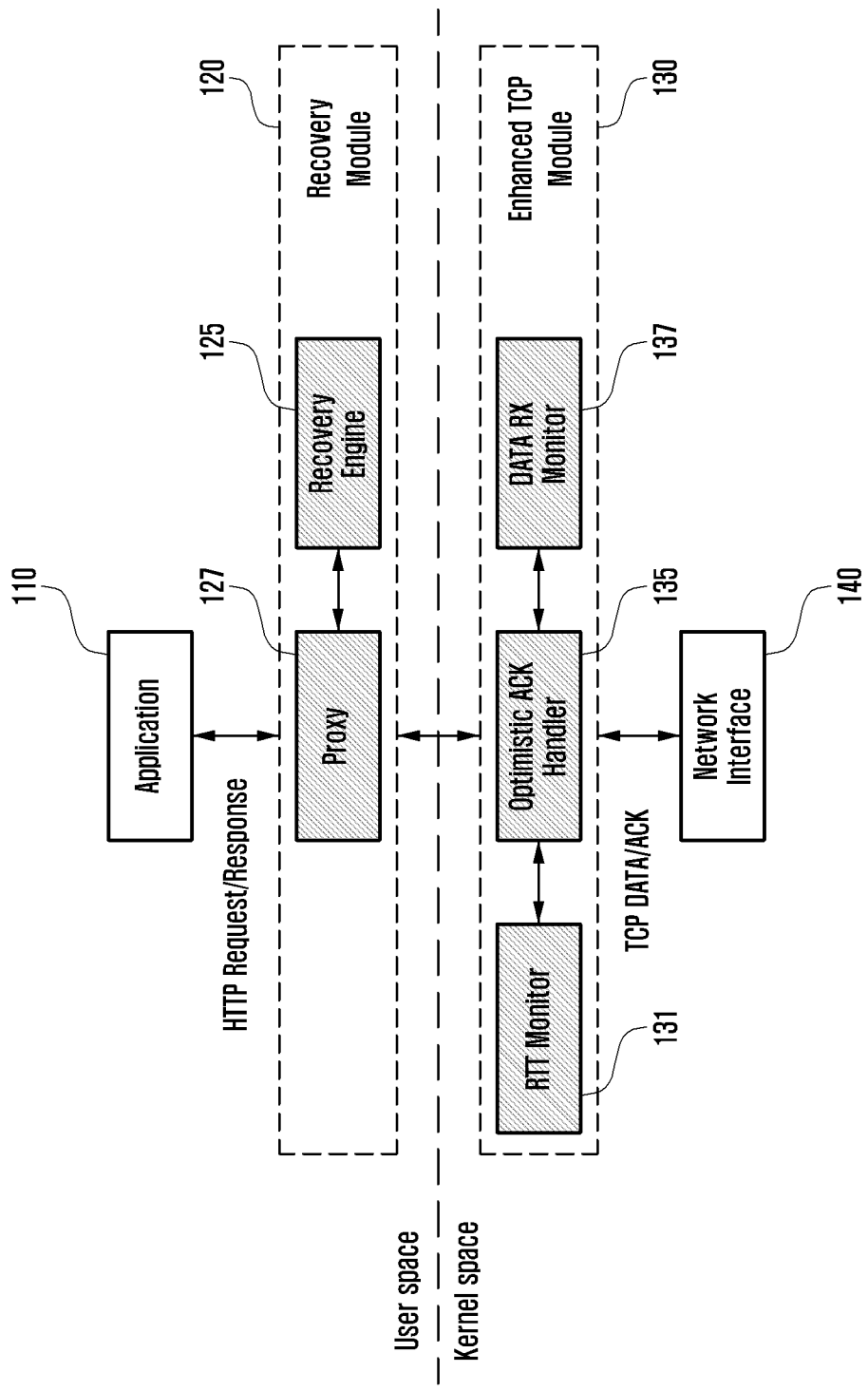
FIG. 1 illustrates a terminal according to an embodiment of the present disclosure.

FIG. 1 illustrates a terminal according to an embodiment of the present disclosure.

The terminal shown in FIG. 1 may be any kind of electronic device that receives data by using a transmission control protocol (TCP), for example, a mobile phone, a smart phone, a smart TV, a computer, a notebook, and the like. In this disclosure, any other term such as a TCP receiving device may be used instead of the terminal for convenience of explanation. In addition, FIG. 1 shows only software modules closely related to an embodiment of the present disclosure, and elements not directly related to the embodiment are omitted.

Referring to FIG. 1, the terminal according to an embodiment of the present disclosure may include an application 110, a recovery module 120, an enhanced TCP module 130, and a network interface 140. Although these elements are depicted individually and separately, at least two of them may be operated by one controller. For example, the recovery module 120 and the enhanced TCP module 130 may be formed as a single controller (not shown).

The application 110 may send and receive traffic at the highest layer, and the network interface 140 may connect communication with other devices at the lowest layer. The application 110 and the network interface 140 may be operated by a communication unit (not shown).

In case of the terminal that is networking with the outside by using the TCP protocol, an operating system (OS) may exist between the application 110 and the network interface 140 so as to abstract a specific networking procedure and provide it to the application 110. The TCP protocol may also be included in the OS.

As shown in FIG. 1, the terminal according to an embodiment of the present disclosure may include the enhanced TCP module 130 and the recovery module 120. This indicates, however, the implementation of software included in the controller (not shown) on the basis of logical explanation. The enhanced TCP module 130 and the recovery module 120 may be implemented as a single module in another embodiment, and thus the software implementation is not always limited to the separation of modules. Also, the enhanced TCP module 130 may be implemented in a kernel space of the OS, and the recovery module 120 may be implemented in a user space. This is, however, exemplary only and not to be construed as a limitation. Alternatively, the enhanced TCP module 130 may be implemented in the user space according to another embodiment.

The enhanced TCP module 130 may include sub-modules, such as a round trip time (RTT) monitor module 131, an optimistic acknowledgment (ACK) handler module 135, and a data receiving (RX) monitor module 137, in addition to a typical TCP basic function. Although the optimistic ACK handler module 135, the RTT monitor module 131, and the data RX monitor module 137 are shown as separate elements, this is exemplary only for convenience of explanation and not to be construed as a limitation. For example, the optimistic ACK handler module 135, the RTT monitor module 131, and the data RX monitor module 137 may be formed as a single TCP module.

The RTT monitor module 131 may perform a function of calculating a minimum RTT with a counterpart device. The minimum RTT may begin to be measured from the time a session connection is attempted by the 3-way handshake of TCP. In the terminal according to an embodiment of the present disclosure, a difference between the time of sending a TCP SYN and the time of receiving a TCP SYN/ACK may be initially taken as the minimum RTT. Thereafter, an RTT is calculated in a process of transmitting and receiving data and ACK segments in a TCP established state, and the minimum RTT may be updated if the newly measured RTT is smaller than the initial minimum RTT. The calculated minimum RTT may be used to stop an operation of sending optimistic ACK at the optimistic ACK handler module 135 and to determine whether to fall back to a normal TCP mode.

The data RX monitor module 137 may perform processing associated with an event of receiving data segments. The data RX monitor module 137 may monitor a reception time interval between data segments to distinguish RTT rounds of data segments, and may store the number of data segments received in each RTT round. In addition, the data RX monitor module 137 may monitor the sequence number of the received data segment, and may start a loss detect timer if an out-of-sequence data segment is received. Also, the data RX monitor module 137 may monitor the sequence number of the received data segment, and may cancel (initialize) the loss detect timer if a data segment corresponding to the sequence number causing the start of the loss detect timer is received.

The optimistic ACK handler module 135 may transmit an optimistic ACK according to a predetermined rule at a predetermined time. In another embodiment, the optimistic ACK handler module 135 may transmit the optimistic ACK after each RTT round. Alternatively, even though the RTT round does not expire, the optimistic ACK handler module 135 may simultaneously transmit an optimistic ACK segment while sending an ACK segment for a currently received data segment. Alternatively, the optimistic ACK handler module 135 may transmit the optimistic ACK segment instead of a normal ACK segment at the time of transmitting the ACK segment for the currently received data segment. Alternatively, the optimistic ACK handler module 135 may transmit the optimistic ACK segment by setting the predetermined time randomly. The transmission of the optimistic ACK may be performed only in the initial RTT round or in several RTT rounds, depending on embodiments. A detailed method of transmitting the optimistic ACK will be described later.

Meanwhile, the recovery module 120 may include a proxy module 127 and a recovery engine module 125. A distinction between the proxy module 127 and the recovery engine module 125 is also exemplary only for logical explanation and not to be construed as a limitation.

The proxy module 127 may perform a function of mediating traffic between the application 110 and a TCP module (e.g., the enhanced TCP module 130). This sub-module is not different in function from a traditional local HTTP proxy, and may be implemented in various forms such as a software library.

If an error due to a loss of the data segment is received from the lower TCP module 130, the recovery engine module 125 may create a hypertext transfer protocol (HTTP) message for requesting retransmission from the next byte of a message-body normally received up to now and then transmit the created message to a transmitting device. In addition, the recovery engine module 125 may receive data corresponding to the retransmission request HTTP message from the transmitting device, concatenate the received data with previously received data, and deliver it to the upper layer.

Figure 2A:
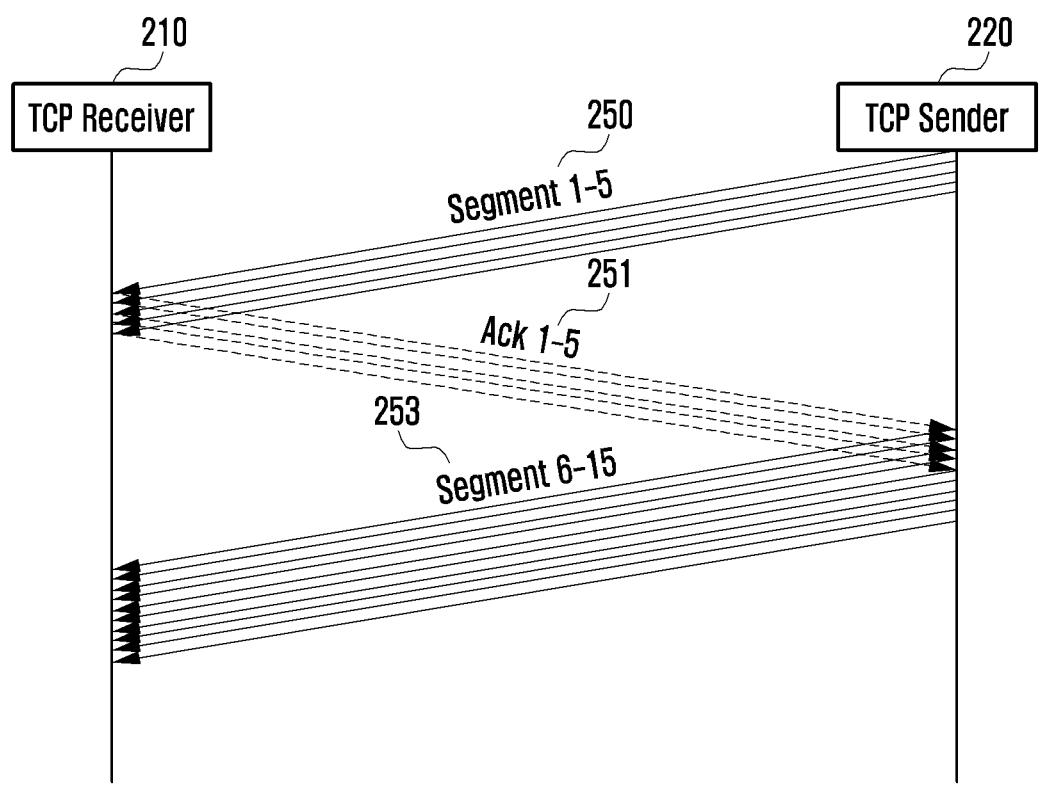
FIGS. 2A, 2B and 2C illustrates an operating principle of an optimistic ACK message.
Figure 2B:
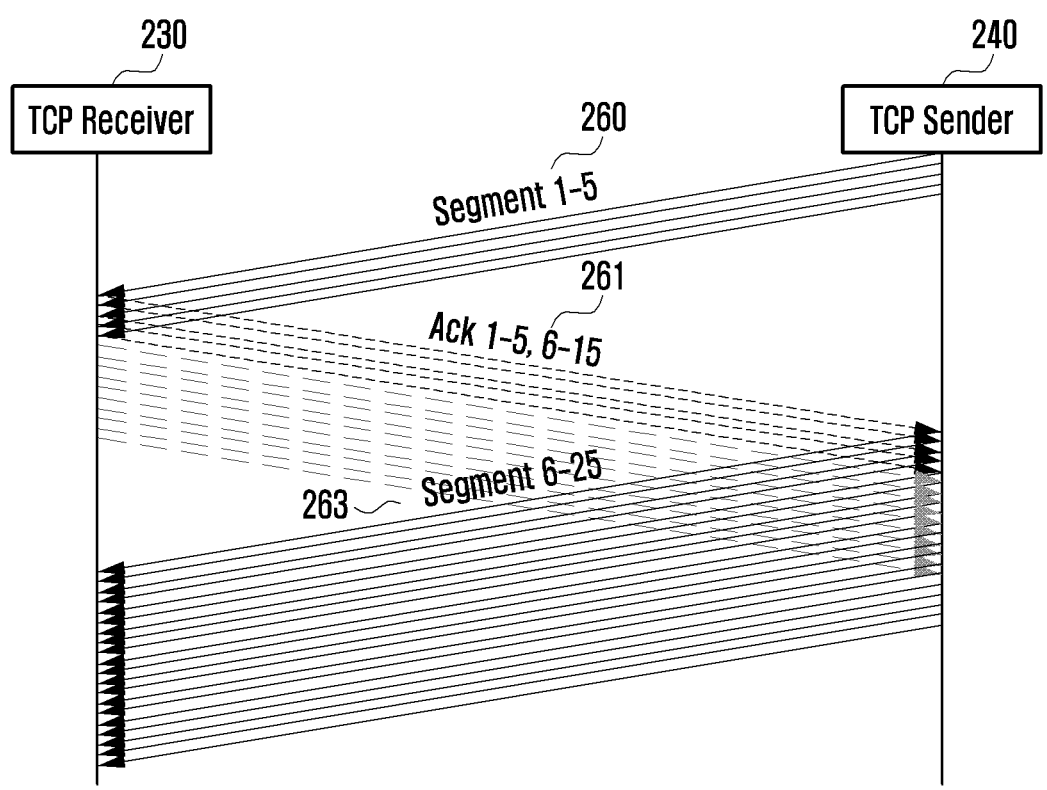
Figure 2C:
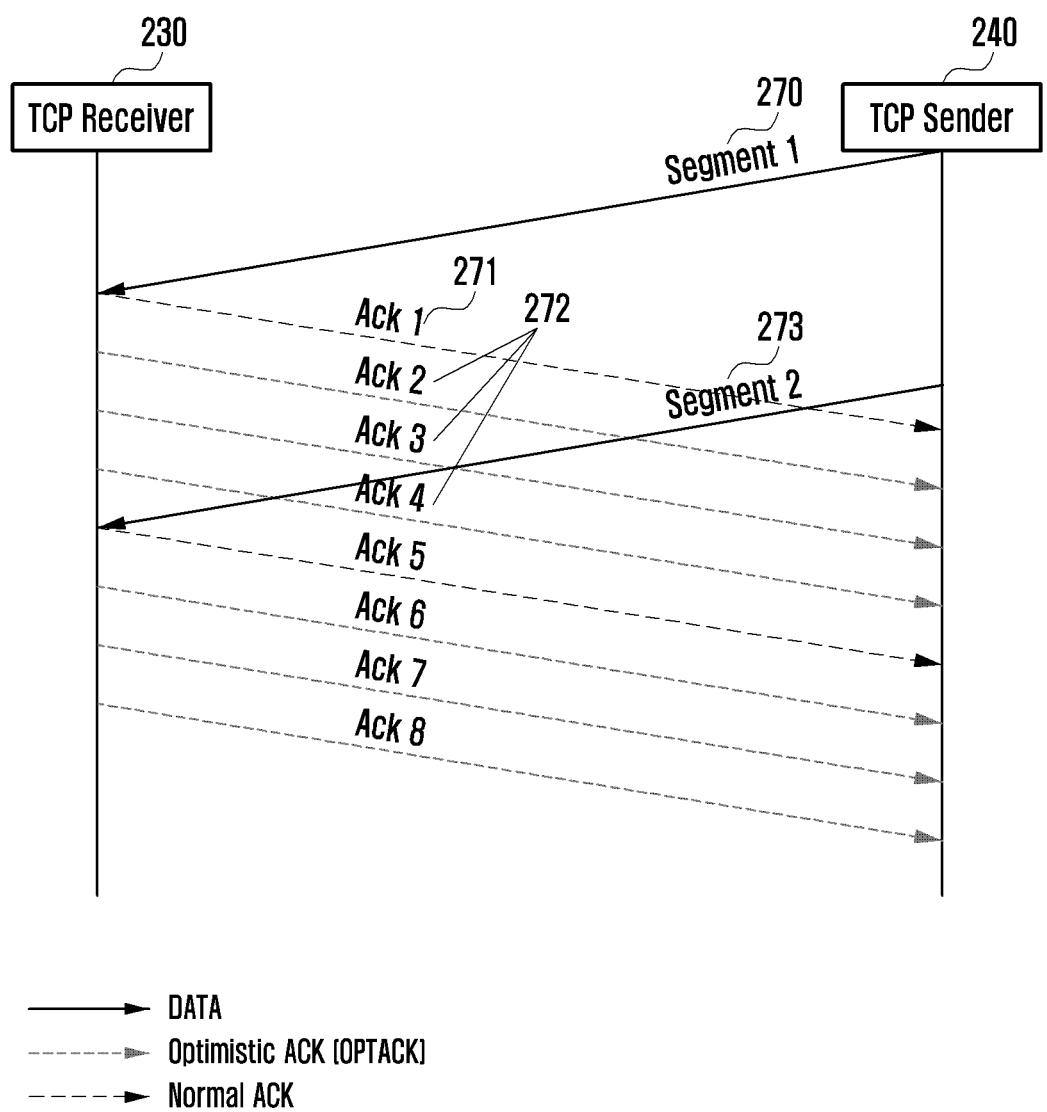

FIGS. 2A, 2B and 2C illustrate an operating principle of an optimistic ACK message.

FIG. 2A illustrates an example of a message exchange according to a TCP operation. Assuming that a congestion window (cwnd) of a TCP sender 220 is 5, the TCP sender 220 initially transmits five data segments (segment 1-5) to a TCP receiver 210 at step 250.

Although actually formed of a byte sequence, the sequence number of TCP is denoted by a segment sequence for convenience of explanation. For the same reason, the acknowledgment number of an ACK segment is also denoted by the sequence number of a target data segment to be acknowledged instead of the byte sequence. For example, ACK i may mean acknowledgment for DATA i.

Meanwhile, in the following descriptions and drawings, it is assumed that a QUICK ACK mode is performed to receive one TCP data segment and then send one TCP ACK segment. It is, however, obvious that a DELAYED ACK mode may be also performed to transmit only a part of a plurality of TCP ACK segments. For example, FIG. 2A exemplarily depicts the QUICK ACK mode in which the TCP receiver 210 receives data segments (segment 1-5) and immediately transmits TCP ACK segments (ACK 1-5) to the TCP sender 220. Alternatively, the TCP receiver 210 may operate in the DELAYED ACK mode, thus not immediately transmitting the ACK segments for all received data segments. Namely, the TCP receiver 210 may delay transmitting an ACK segment in response to one received data segment and then transmit it after a predetermined time delay or transmit only a TCP ACK segment corresponding to another data segment received thereafter. In this case, even through all responses to the data segments (segment 1-5) are not performed, the cumulative ACK attribute of the TCP ACK mechanism may allow the transmission of an ACK segment for the latest data segment to further indicate the responses to the previous data segments. For example, when receiving five data segments (segment 1-5), the TCP receiver 210 may send only one ACK segment (ACK 5) as a corresponding TCP ACK segment. In another example, the TCP receiver 210 may send one ACK segment (ACK 2, 4) whenever receiving two TCP data segments and then send an ACK segment (ACK 5) in response to the last data segment (segment 5) after a predetermined time delay.

The TCP receiver 210 that receives the data segments may transmit immediate ACK segments (ACK 1-5) for the respective received data segments to the TCP sender 220 at step 251. At this step, although not shown, the TCP receiver 210 may alternatively use the delayed ACK function.

Since the TCP sender 220 is initially placed in a slow start state, it is possible to increase cwnd according to Equation 1 whenever the ACK segment is received.

Cwnd+=min(newly acked bytes,maximum segment size(MSS))     Equation 1

As a result, the cwnd of the TCP sender 220 may increase exponentially whenever one RTT round passes. Thus, at step 253, the TCP sender 220 can transmit ten data segments (segments 6-15) twice as many as the initial cwnd in the next RTT round.

FIG. 2B illustrates an example of a TCP message exchange in case of using optimistic ACK according to an embodiment of the present disclosure.

Contrary to the TCP message exchange method shown in FIG. 2A, the TCP message exchange method according to an embodiment of the present disclosure shown in FIG. 2B may enable a TCP receiver 230 to receive five data segments (segment 1-5) in five initial RTT rounds (step 260) and then to send additional ACK segments to a TCP sender 240 (step 261). For example, in addition to five ACK segments (ACK 1-5) corresponding to the received five data segments (segment 1-5), the TCP receiver 230 may further transmit ten additional ACK segments (ACK 6-15) to the TCP sender 240 (step 261). Namely, although only the five data segments (segments 1-5) are received, the TCP receiver 230 may assume the effective reception of the sixth data segment (segment 6) and transmit an ACK segment (ACK 6) for the non-received sixth data segment (segment 6) to the TCP sender 240. Similarly, the TCP receiver 230 may assume the effective reception of the seventh data segment (segment 7) to the fifteenth data segment (segment 15) and transmit ACK segments (ACK 7-15) for these non-received data segments (segment 7-15) to the TCP sender 240. In this case, such further transmitted ACK segments (ACK 6-15) may be referred to as additional ACK segments or optimistic ACK segments. The additional ACK segment (or the optimistic ACK segment) indicates an ACK segment transmitted on the assumption that a certain data segment, not received yet by the TCP receiver 230, is received effectively.

In this disclosure, the TCP receiver 230 may be referred to as any other term such as a terminal or a receiving device, and also the TCP sender 240 may be referred to as any other term such as a transmitter or a transmitting device.

Meanwhile, after the first through fifth ACK segments (ACK 1-5) are received, the TCP sender 240 may increase the cwnd and transmit the next data segment which is waiting (step 263). In this case, for example, the TCP sender 240 that transmits the sixth data segment (segment 6) can receive the sixth ACK segment (ACK 6) after a time interval shorter than the actual RTT. Therefore, the TCP sender 240 increases the cwnd very rapidly as if it is placed in a network having a very short RTT. Consequently, this may reduce the inefficiency of a typical slow start section.

The TCP receiver 230 needs to determine when and how many optimistic ACK segments will be transmitted. In addition, it is necessary to prevent the TCP sender 240 from receiving the optimistic ACK segment before transmitting the corresponding data segment.

For this, the TCP receiver 230 may transmit the optimistic ACK segment at a predetermined time. In another embodiment, the TCP receiver 230 may send the optimistic ACK segment just after the RTT round is terminated. Alternatively, even though the RTT round is not terminated, the TCP receiver 230 may transmit the optimistic ACK segment while transmitting the ACK segment for the currently received data segment. Alternatively, the TCP receiver 230 may transmit the optimistic ACK segment by setting the predetermined time randomly.

For example, the TCP receiver 230 may transmit a predetermined number of optimistic ACK segments immediately after receiving all the data segments in the RTT round. Referring to FIG. 2B, the TCP receiver 230 may immediately transmit the sixth through fifteenth optimistic ACK segments (ACK 6-15) (step 261) just after receiving the first through fifth data segments (segment 1-5) (step 260), namely, just after the initial RTT round is terminated. In this case, the number of optimistic ACK segments may be predetermined experimentally. Although the predetermined number of optimistic ACK segments is ten (i.e., ACK 6-15) in FIG. 2B, this is exemplary only and not to be construed as a limitation.

In another embodiment, the predetermined number of optimistic ACK segments may be equal to the number of data segments received in the current RTT round. If the TCP sender 240 receives a normal ACK segment, the cwnd is doubled and thus the TCP sender 240 can transmit data segments corresponding to optimistic ACK segments before receiving the optimistic ACK segments. It is therefore possible to prevent the TCP sender 240 from receiving the optimistic ACK segment corresponding to the data segment before transmitting the data segment.

For example, the TCP receiver 230 that receives the first through fifth data segments in the RTT round may transmit the normal first through fifth ACK segments to the TCP sender 240. Then the TCP receiver 230 may transmit a predetermined number of optimistic ACK segments just after the end of the RTT round, namely, after the transmission of the fifth ACK segment. At this time, the TCP receiver 230 may transmit, to the TCP sender 240, the same number of optimistic ACK segments as the number of data segments received during the RTT round. In this example, the TCP receiver 230 may transmit five optimistic ACK segments, i.e., the sixth through tenth optimistic ACK segments, to the TCP sender 240. In this case, since the cwnd has been already increased to ten after the reception of the first through fifth ACK segments, the TCP sender 240 may transmit the sixth through tenth data segments corresponding to the sixth through tenth optimistic ACK segments before receiving the sixth through tenth optimistic ACK segments.

Also, referring to FIG. 2C, the TCP receiver 230 may transmit an optimistic ACK segment while transmitting an ACK segment for a currently received data segment even though the RTT round is not yet terminated. For example, the TCP receiver 230 may receive the first data segment (segment 1) (step 270) and then transmit a corresponding ACK segment (ACK 1) to the TCP sender 240 (step 271). In addition, assuming the effective reception of the second through fourth data segments even though the RTT round is not yet terminated, the TCP receiver 230 may transmit optimistic ACK segments (ACK 2, ACK 3, and ACK 4) for the second through fourth data segments to the TCP sender 240 (step 272). Meanwhile, even in this case, it is possible to prevent the TCP sender 240 from receiving the optimistic ACK segment (ACK 2) corresponding to the second data segment (segment 2) before transmitting the second data segment (segment 2) (step 273).

Although FIG. 2C shows that the TCP receiver 230 transmits a plurality of optimistic ACK segments after receiving one data segment, this is exemplary only and not to be construed as a limitation. Alternatively, the TCP receiver 230 may receive a plurality of data segments and then transmit one optimistic ACK segment. For example, the TCP receiver 230 may receive the first and second data segments, then transmit the first and second ACK segments (ACK 1, ACK 2) for the first and second data segments, and further transmit the third optimistic ACK segment (ACK 3) for the third data segment to the TCP sender 240 by assuming the effective reception of the third data segment. Alternatively, the TCP receiver 230 may transmit a plurality of optimistic ACK segments after receiving a plurality of data segments. For example, the TCP receiver 230 may receive the first and second data segments, then transmit the first and second ACK segments (ACK 1, ACK 2) for the first and second data segments, and further transmit the third and fourth optimistic ACK segments (ACK 3, ACK 4) for the third and fourth data segments to the TCP sender 240 by assuming the effective reception of the third and fourth data segments.

In an embodiment, the TCP receiver 230 may determine the transmission time of the optimistic ACK segment by using the initial RTT measured in a process of creating a connection with the TCP sender 240. For example, if the initial RTT calculated in the connection process is greater than a predetermined time, the TCP receiver 230 may transmit the optimistic ACK segment immediately after the RTT round is terminated. If the initial RTT calculated in the connection process is smaller than the predetermined time, the TCP receiver 230 may transmit the optimistic ACK segment while transmitting an ACK segment for a currently received data segment even through the RTT round is not terminated.

Meanwhile, the TCP receiver 230 may transmit the optimistic ACK segment only in the slow start state. If the TCP receiver 230 is placed in the slow start state, it is possible to create an available window having more optimistic ACK segments. However, in the congestion avoidance state, a problem that the TCP sender 240 receives the optimistic ACK segment before transmitting the corresponding data segment may arise.

In this case, the TCP receiver 230 may observe the length of a data train and thereby determine a current transmission state (i.e., the slow start state or the congestion avoidance state). A detailed description will be given later.

In another embodiment, the TCP receiver 230 may compare the length of a data train (i.e., the elapsed time of a current RTT round) with the minimum one-way delay time and thereby determine whether to transmit the optimistic ACK segment.

Meanwhile, although previously transmitting the optimistic ACK segment corresponding to the data segment on the assumption that the data segment will be received effectively, the TCP receiver 230 may fail to actually receive the data segment corresponding to the optimistic ACK segment.

In this case where the data segments are not received in sequence, the TCP receiver 230 may drive a loss detect timer. If any missing data segment is not received until the loss detect timer expires, the TCP receiver 230 may transmit a message including information indicating an error occurrence to the TCP sender 240.

Alternatively, the TCP receiver 230 may drive the loss detect timer for each optimistic ACK segment when transmitting the optimistic ACK segment. For example, in case of transmitting the sixth through tenth optimistic ACK segments, the TCP receiver 230 may drive the sixth through tenth loss detect timers corresponding to the sixth through tenth optimistic ACK segments. Then, if a data segment corresponding to each timer is not received until each timer expires, the TCP receiver 230 may transmit an error message to the TCP sender 240.

Hereinafter, an operation of the TCP receiver 230 (i.e., a terminal) according to an embodiment of the present disclosure will be described in detail.

Figure 3A:
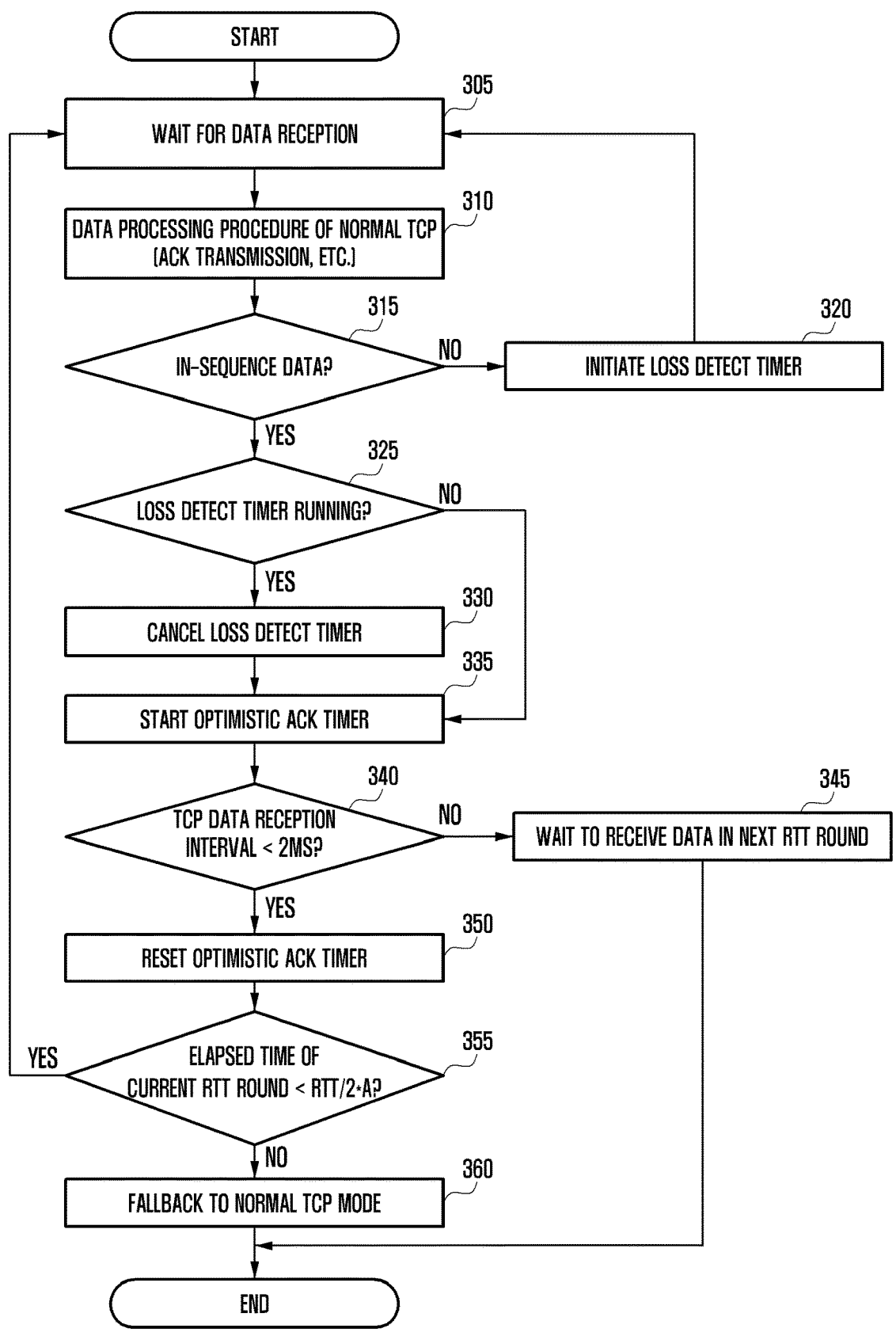
FIGS. 3A and 3B illustrates an operation of a terminal for receiving a data segment according to an embodiment of the present disclosure.
Figure 3B:
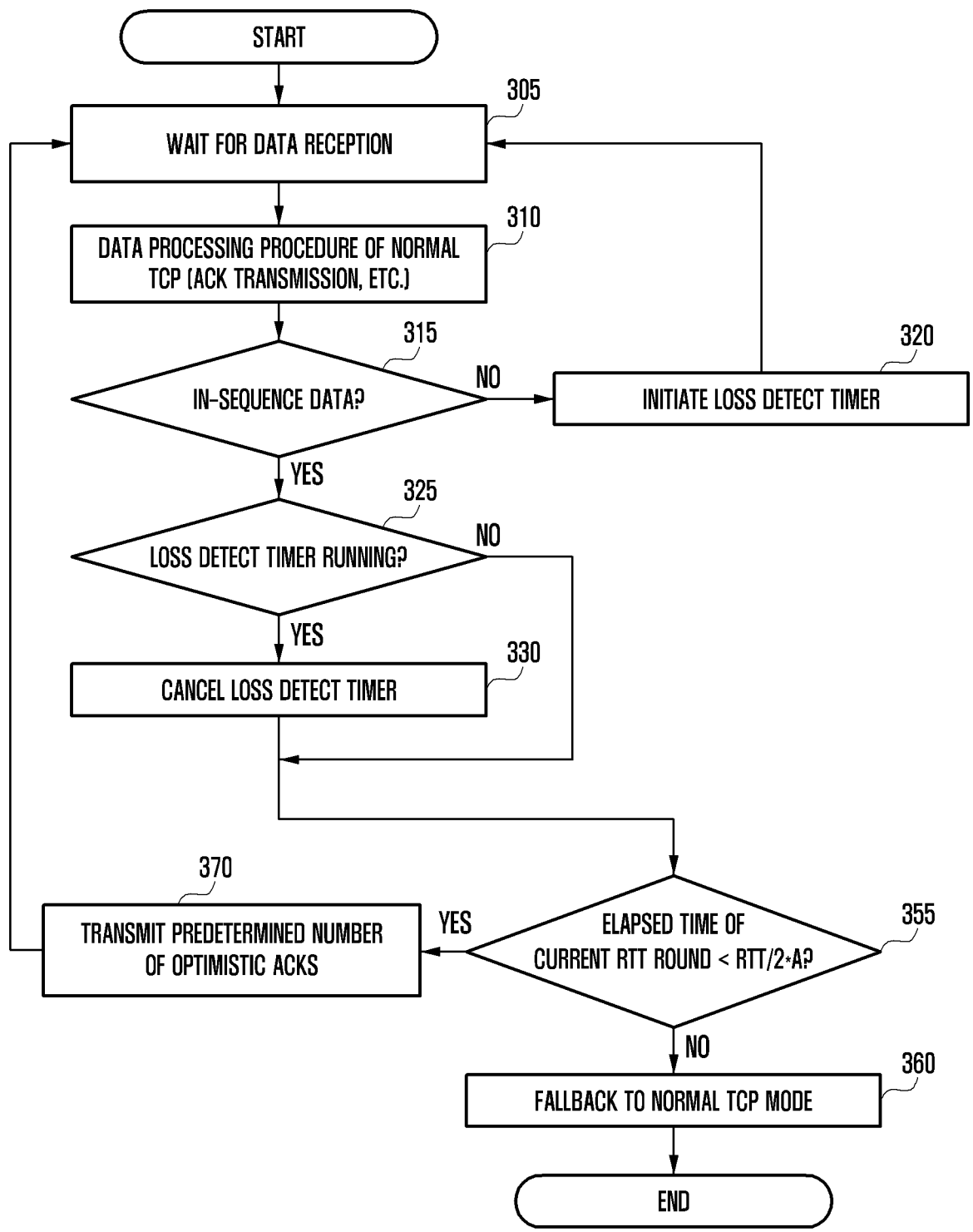

FIGS. 3A and 3B illustrate an operation of a terminal for receiving a data segment according to an embodiment of the present disclosure.

Referring to FIG. 3A, at step 305, the terminal according to an embodiment of the present disclosure may wait for the reception of a data segment in a state where TCP is established after a TCP session connection process is completed. When a TCP data segment is received, the terminal proceeds to step 310.

At step 310, the terminal may perform a processing procedure such as header processing, ACK segment creation and transmission after receiving the data segment in accordance with a typical TCP protocol standard.

At step 315, the terminal may check whether the data segments are received in sequence without a missing sequence number.

In the typical TCP, if any data segment is not received in sequence, this may result from a delay difference due to the multipath of Internet. However, when the terminal transmits the optimistic ACK according to this disclosure, it is necessary to check whether any data segment is lost in a transmission process. Thus, if any data segment is not received in sequence, the terminal may initiate a loss detect timer at step 320. If the loss detect timer expires, the corresponding data segment will be considered lost in the transmission process.

For example, if the terminal receives the ninth data segment after receiving the sixth and seventh data segments, the terminal may start the loss detect timer because the eighth data segment is not received. If the eighth data segment is not received until the loss detect timer expires, the eighth data segment may be regarded as being lost in the transmission process. A related operation of the terminal will be described later.

If it is determined at step 315 that the data segments are received in sequence, the terminal may further check at step 325 whether the loss detect timer is running. If the loss detect timer is running, the terminal may cancel the loss detect timer at step 330 because the data segments are received in sequence without loss. This is to cancel the loss detect timer when a data segment causing the loss detect timer to be run is received. For example, if the loss detect timer is started because the eighth data segment is not received, and if the eighth data segment is received thereafter, the terminal may cancel the loss detect timer.

Thereafter, at step 335, the terminal may start an optimistic ACK timer. In this case, the optimistic ACK timer may be used for indicating a predetermined time point at which the optimistic ACK segment will be transmitted. For example, the expiration of the optimistic ACK timer may indicate the termination of the RTT round. If the optimistic ACK timer expires, the terminal may transmit the optimistic ACK segment after determining whether to actually perform the optimistic ACK transmission. A related process will be described in detail later with reference to FIGS. 5 and 6.

According to an embodiment, the terminal may check at step 340 whether an interval between the reception time of the previous data segment and the reception time of the current data segment is within a predetermined time interval (e.g., 2 ms). This predetermined time interval is defined for determining whether a series of data segments belongs to one RTT round. For example, if the reception time interval of two data segments is smaller than 2 ms, the terminal may determine that both data segments are in the same RTT round. Otherwise, the terminal may determine that the RTT round is changed.

If the interval between the reception time of the previous data segment and the reception time of the current data segment is within the predetermined time interval, the terminal may proceed to step 350 to reset the optimistic ACK timer.

On the other hand, if the interval between the reception time of the previous data segment and the reception time of the current data segment exceeds the predetermined time interval, the terminal may proceed to step 345 to wait for the reception of a data segment in the next RTT round. This step may include a process of initializing variables (e.g., the start time of the RTT round, etc.) maintained and managed in each RTT round.

According to an embodiment, at step 355, the terminal may compare the elapsed time of the current RTT round with the minimum one-way delay time. This is to prevent the sender from receiving the optimistic ACK before transmitting the corresponding data segment if the terminal transmits the optimistic ACK in a certain state which is the slow start state but close to the congestion avoidance state. In this case, the minimum one-way delay time may be equal to $$\frac{\text{Min.}RTT}{2} \times a (0 < a \le 1).$$

If the elapsed time of the RTT round is greater than (or equal to or greater than) the minimum one-way delay time, the terminal may proceed to step 360 to return to the normal TCP mode in which the optimistic ACK transmission method of this disclosure is not used. The close proximity of a series of data segments to the minimum one-way delay time, $$\frac{\text{Min.}RTT}{2},$$

may be regarded as meaning that the cwnd of the TCP sender is close to a bandwidth delay product (BDP) on a network path between the sender and the receiver. Therefore, there is a possibility that loss of a data segment may occur, so that the terminal comes to operate conservatively without using the optimistic ACK. In the opposite case, the terminal may proceed to step 305 and wait again to receive a data segment in the current RTT round.

Meanwhile, although not shown, the terminal that receives data at step 305 may determine whether to perform an operation of transmitting the optimistic ACK or perform an operation according to the typical TCP mode. In case a frequent loss of data segments is expected because of a congested state of the current network, in case a server has a failure history, in case the RTT with a server is measured to be short, or the like, the terminal may determine no transmission of the optimistic ACK and operate in accordance with the typical TCP mode.

In addition, although not shown, the terminal according to an embodiment of the present disclosure may perform operations in a normal mode on the TCP layer and then perform steps 315, 325, 340, 355, and the like. If all conditions are satisfied and thus if there are instructions to initiate the transmission of the optimistic ACK segment, the terminal may perform an operation of transmitting the optimistic ACK segment.

Meanwhile, referring to FIG. 3B, the terminal may perform steps 305 through 330. Since these steps are similar to those of FIG. 3A, a detailed description thereof will be omitted.

After terminating the loss detect timer at step 330, the terminal may compare the elapsed time of the current RTT round with the minimum one-way delay time at step 355. This is to prevent the sender from receiving the optimistic ACK before transmitting the corresponding data segment if the terminal transmits the optimistic ACK in a certain state which is the slow start state but close to the congestion avoidance state. In this case, the minimum one-way delay time may be equal to $$\frac{\text{Min}.RTT}{2} \times a (0 < a \le 1).$$

Namely, the terminal may not perform steps 335 through 350 shown in FIG. 3A.

If the elapsed time of the RTT round is greater than (or equal to or greater than) the minimum one-way delay time, the terminal may proceed to step 360 to return to the normal TCP mode in which the optimistic ACK transmission method of this disclosure is not used.

On the other hand, if the elapsed time of the RTT round is not greater than (or equal to or not greater than) the minimum one-way delay time, the terminal may transmit a predetermined number of optimistic ACK segments at step 370. Then the terminal may return to step 305 and wait again to receive a data segment in the current RTT round. In case of FIG. 3B, the terminal may transmit the optimistic ACK segment while transmitting the ACK segment for the currently received data segment even though the RTT round is not terminated.

In embodiments, the operations of the terminal as shown in FIGS. 3A and 3B may be performed by the enhanced TCP module of the terminal.

Figure 4:
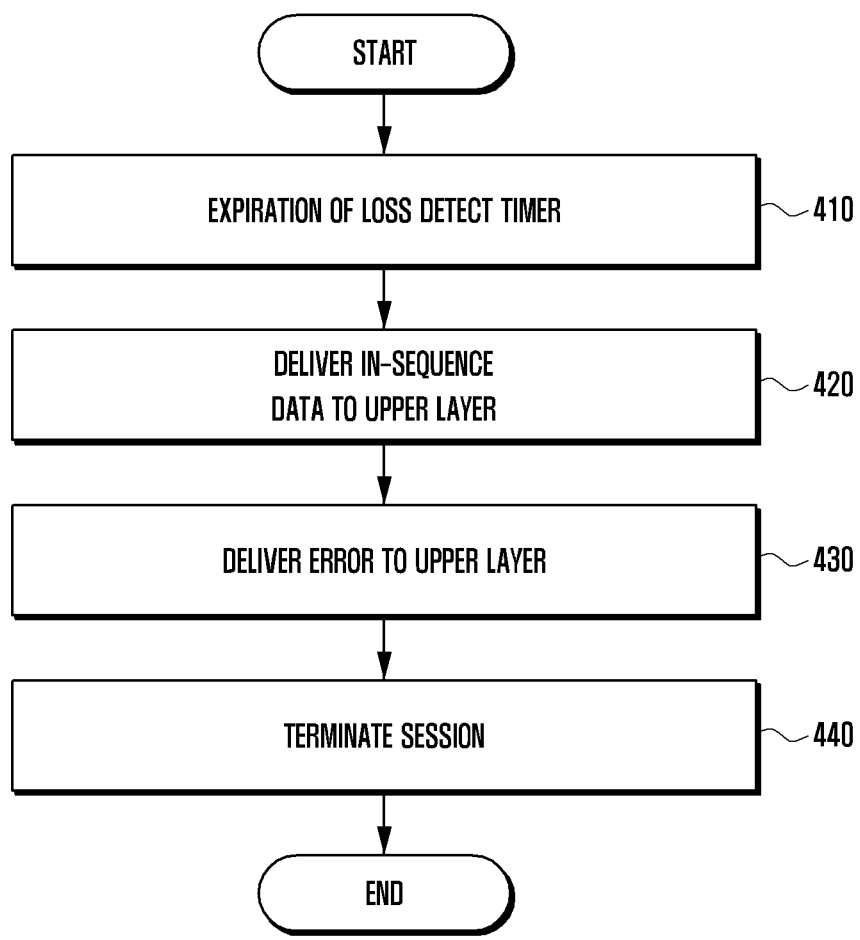
FIG. 4 illustrates an operation of a terminal when a loss detect timer expires according to an embodiment of the present disclosure.

FIG. 4 illustrates an operation of a terminal when a loss detect timer expires according to an embodiment of the present disclosure.

Referring to FIG. 4, at step 410, the terminal may wait for the loss detect timer to expire. When an expiration event of the timer occurs, the terminal may proceed to step 420.

At step 420, the enhanced TCP module of the terminal may deliver data, sequentially transmitted up to now, to the upper layer. In addition, at step 430, the enhanced TCP module of the terminal may deliver the occurrence of an error to the upper layer, namely, to the recovery module. For example, this error may be a new type of socket error in case the recovery module and the enhanced TCP module communicate using a socket interface. Information indicating the occurrence of an error may be delivered to the upper layer through recvmsg ( ).

In addition, according to an embodiment, the terminal may terminate at step 440 a TCP session in which an error occurs. Alternatively, according to another embodiment, the terminal may not terminate the error-occurring TCP session and use it for retransmission of a lost data segment.

Figure 5:
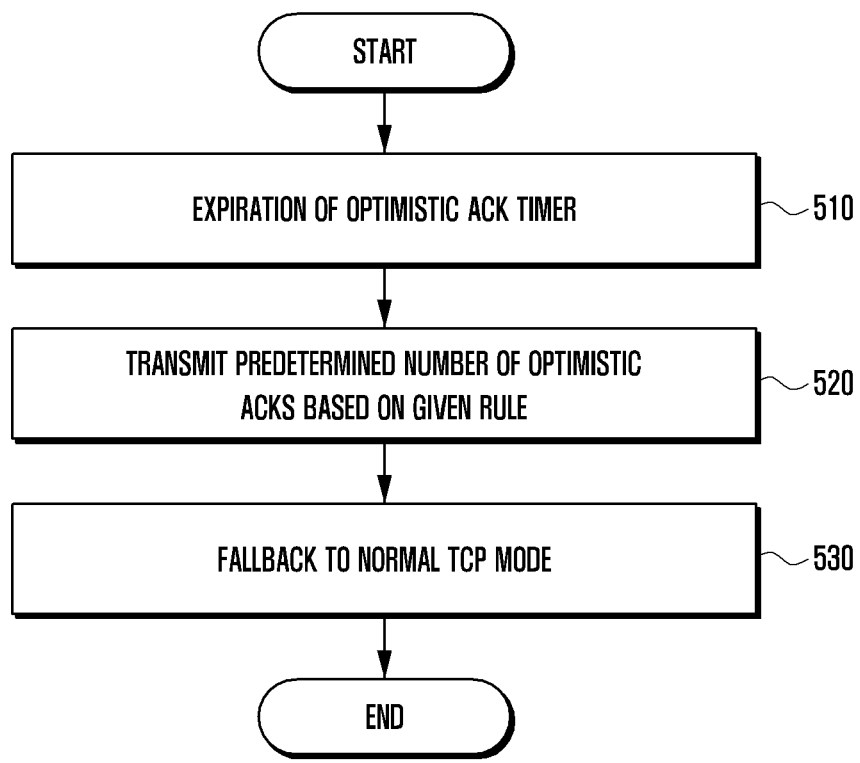
FIG. 5 illustrates an operation of a terminal when an optimistic ACK timer expires according to an embodiment of the present disclosure.

FIG. 5 illustrates an operation of a terminal when an optimistic ACK timer expires according to an embodiment of the present disclosure.

Referring to FIG. 5, at step 510, the terminal may wait for the expiration of the optimistic ACK timer. If an expiration event of the optimistic ACK timer occurs, the terminal may proceed to step 520. According to an embodiment, the expiration of the optimistic ACK timer may indicate the end of the current RTT round. Namely, when the current RTT round is terminated, the terminal may perform step 520. According to another embodiment, the expiration of the optimistic ACK timer may mean the reception of a predetermined number of data segments. Namely, the terminal may perform step 520 after receiving a predetermined number of data segments. In this case, the terminal may transmit the optimistic ACK segment while transmitting the ACK segment for the currently received data segment even though the current RTT round is not terminated.

At step 520, the terminal may transmit a predetermined number of optimistic ACK segments to a TCP sender. According to an embodiment, the predetermined number may be equal to the number of data segments received during the RTT round. According to another embodiment, the predetermined number may be a given fixed value regardless of the number of data segments received during the RTT round.

At step 530, the terminal may return to a normal TCP mode not using the optimistic ACK transmission. Namely, in this embodiment of FIG. 5, the optimistic ACK is used only in the initial RTT round, and a receiving operation of the normal TCP mode may be performed in the next RTT round.

According to an embodiment, the operation of the terminal as shown in FIG. 5 may be performed by the enhanced TCP module of the terminal.

Figure 6:
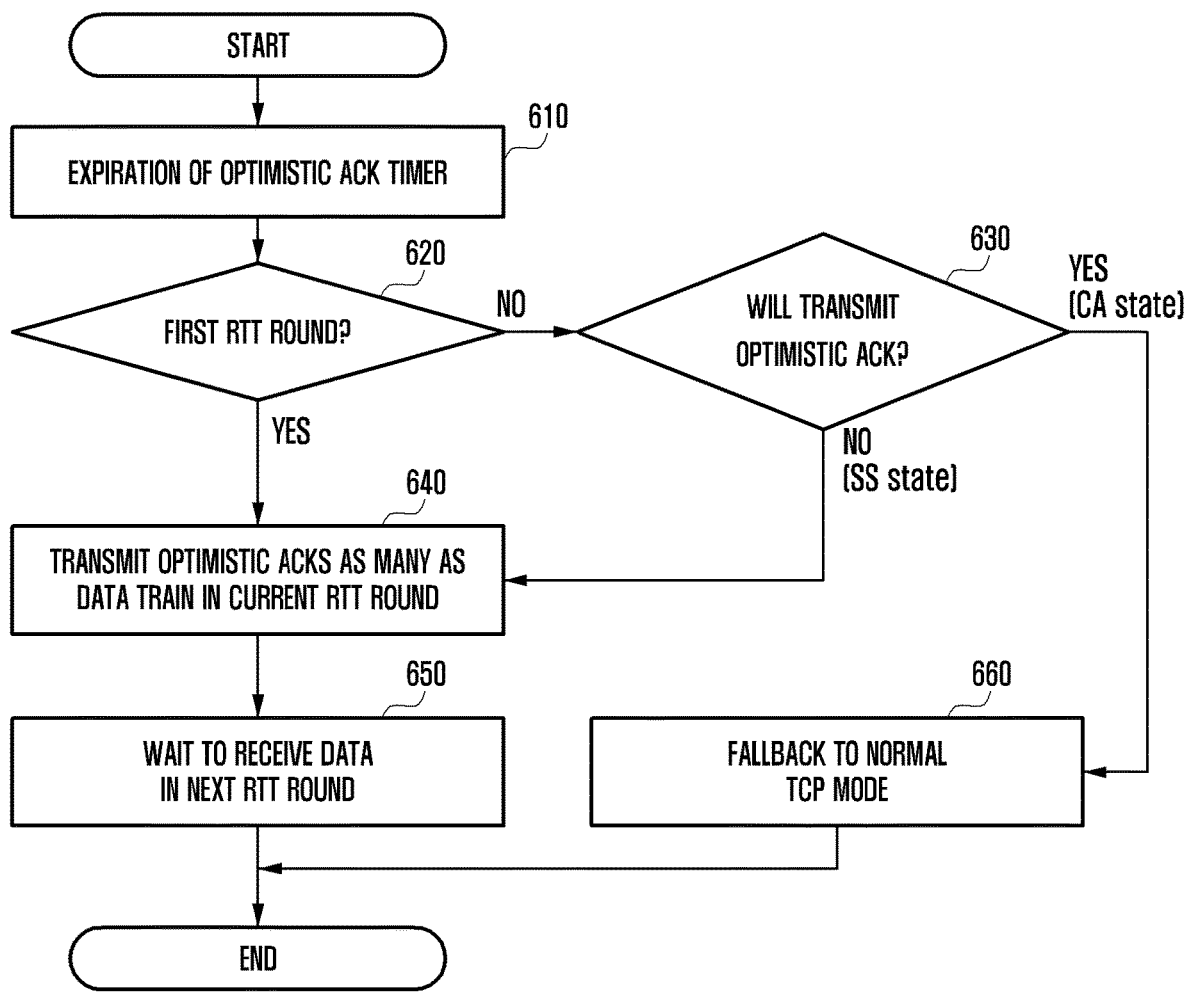
FIG. 6 illustrates another example of an operation of a terminal when an optimistic ACK timer expires according to an embodiment of the present disclosure.

FIG. 6 illustrates another example of an operation of a terminal when an optimistic ACK timer expires according to an embodiment of the present disclosure.

Referring to FIG. 6, at step 610, the terminal may wait for the expiration of the optimistic ACK timer. If an expiration event of the optimistic ACK timer occurs, the terminal may proceed to step 620. According to an embodiment, the expiration of the optimistic ACK timer may indicate the end of the current RTT round. Namely, when the current RTT round is terminated, the terminal may perform step 620. According to another embodiment, the expiration of the optimistic ACK timer may mean the reception of a predetermined number of data segments. Namely, the terminal may perform step 620 after receiving a predetermined number of data segments.

At step 620, the terminal may determine whether a current RTT round is the first RTT round after a TCP session is established.

In case of the first RTT round, the terminal may proceed to step 640 and transmit a predetermined number of optimistic ACK segments to the TCP sender. According to an embodiment, at step 640, the terminal may transmit to the TCP sender the optimistic ACK segments as many as the number of data segments received in the current RTT round.

Meanwhile, if the current RTT round is not the first RTT round, the terminal may further determine at step 630 whether a current state is a slow start state or a congestion avoidance state. Namely, at step 630, the terminal may determine whether to transmit an optimistic ACK segment.

For this, the terminal may compare the number of data segments received in the current RTT round with the sum of the number of data segments received in the previous RTT round and the number of ACK segments transmitted in the previous RTT round. The number of ACK segments transmitted in the previous RTT round includes both the number of normal ACK segments and the number of optimistic ACK segments. The number of normal ACK segments means the number of ACK segments transmitted in response to the data segments received in the previous RTT round by the terminal.

If the number of data segments received in the current RTT round is smaller than the sum of the number of data segments received in the previous RTT round and the number of ACK segments transmitted in the previous RTT round, the terminal may estimate that the TCP sender enters into the congestion avoidance state. In this case, the terminal may proceed to step 660 and return to the normal TCP mode in which the optimistic ACK is no longer used.

On the other hand, if the number of data segments received in the current RTT round is not smaller than the sum of the number of data segments received in the previous RTT round and the number of ACK segments transmitted in the previous RTT round, the terminal may estimate that the TCP sender is placed in the slow start state. In this case, the terminal may proceed to step 640 and transmit a predetermined number of optimistic ACK segments to the TCP sender. According to an embodiment, at step 640, the terminal may transmit to the TCP sender the optimistic ACK segments as many as the number of data segments received in the current RTT round.

Meanwhile, at step 630, the terminal may determine whether to transmit the optimistic ACK segment by comparing the length of a data train (i.e., the elapsed time of the current RTT round) with the minimum one-way delay time. In addition, according to another embodiment, if the number of data segments received in the current RTT round is not smaller than the sum of the number of data segments received in the previous RTT round and the number of ACK segments transmitted in the previous RTT round, the terminal may determine whether to transmit the optimistic ACK segment by comparing the elapsed time of the current RTT round with the minimum one-way delay time.

This is to prevent a problem that the sender may receive in advance the optimistic ACK before transmitting the corresponding data segment if the terminal transmits the optimistic ACK in a certain state which is the slow start state but close to the congestion avoidance state. In this case, the minimum one-way delay time may be equal to $$\frac{\text{Min.}RTT}{2} \times a (0 < a \leq 1).$$

If the elapsed time of the current RTT round is greater than the minimum one-way delay time, the terminal may proceed to step 660 and return to the normal TCP mode in which the optimistic ACK transmission method of this disclosure is not used.

If the elapsed time of the current RTT round is not greater than the minimum one-way delay time, the terminal may proceed to step 640 and transmit a predetermined number of the optimistic ACK segments to the TCP sender.

According to another embodiment, at step 630, the terminal may determine whether to transmit the optimistic ACK segment by comparing the total number of the optimistic ACK segments transmitted so far with a predetermined threshold value (MAX_NUM). If the total number of the transmitted optimistic ACK segments is greater than the predetermined threshold value (e.g., the maximum number of transmitted optimistic ACK segments; MAX_NUM), the terminal may proceed to step 660 and transmit no optimistic ACK segment.

On the other hand, if the total number of the transmitted optimistic ACK segments is smaller than the predetermined threshold value (MAX_NUM), the terminal may proceed to step 640 and transmit a predetermined number of the optimistic ACK segments to the TCP sender.

According to still another embodiment, at step 630, the terminal may determine whether to transmit the optimistic ACK segment by comparing the number of retransmissions by the recovery module with a predetermined threshold value (e.g., the maximum number of retransmission; MAX_RETRY). If the number of retransmissions by the recovery module is greater than the predetermined threshold value (MAX_RETRY), the terminal may proceed to step 660 and not transmit the optimistic ACK segment. A detailed description of the retransmission by the recovery module will be given later.

On the other hand, if the number of retransmissions by the recovery module is smaller than the predetermined threshold value (MAX_RETRY), the terminal may proceed to step 640 and transmit a predetermined number of the optimistic ACK segments to the TCP sender.

According to yet another embodiment, at step 630, the terminal may determine whether to transmit the optimistic ACK segment by comparing the ratio of the number of data segments received in the current RTT round to the number of data segments received in the previous RTT round (i.e., the number of data segments received in the current RTT round/the number of data segments received in the previous RTT round) with a predetermined threshold value ($\delta$).

For example, if the TCP sender is in the slow start state, the cwnd may be doubled for each RTT round. In this case, the ratio of the number of data segments received in the current RTT round to the number of data segments received in the previous RTT round may be equal to two in the slow start state. On the other hand, in the congestion avoidance state, the cwnd may not increase almost. Therefore, in the congestion avoidance state, the ratio of the number of data segments received in the current RTT round to the number of data segments received in the previous RTT round may be close to one.

Therefore, if the ratio of the number of data segments received in the current RTT round to the number of data segments received in the previous RTT round is smaller than the predetermined threshold value ($\delta$), the terminal may determine that the current state is the congestion avoidance state. Then the terminal may proceed to step 660 and not transmit the optimistic ACK segment. For example, the predetermined threshold value ($\delta$) may be a value between 1 and 2.

On the other hand, if the ratio of the number of data segments received in the current RTT round to the number of data segments received in the previous RTT round is not smaller than the predetermined threshold value ($\delta$), the terminal may proceed to step 640 and transmit a predetermined number of optimistic ACK segments to the TCP sender.

After step 640, the terminal may proceed to step 650 and wait for the reception of a data segment in the next RTT round. This step may include a process of initializing variables (e.g., the start time of the RTT round, etc.) maintained and managed in each RTT round.

According to an embodiment, the operation of the terminal as shown in FIG. 6 may be performed by the enhanced TCP module of the terminal.

Figure 7:
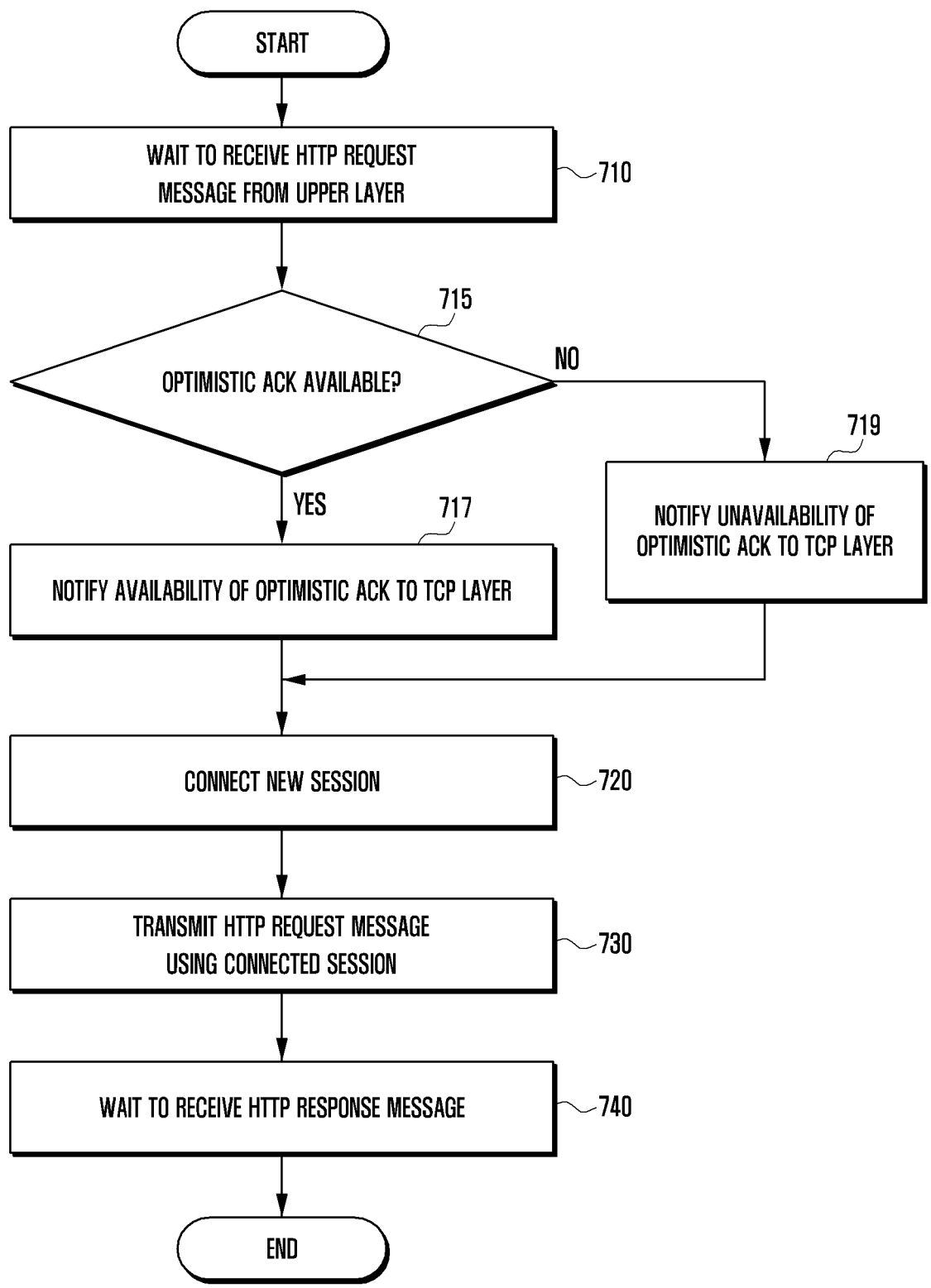
FIG. 7 illustrates an operation of receiving a message sent to a counterpart device by an upper layer and transmitting the message through a lower layer in a terminal according to an embodiment of the present disclosure.

FIG. 7 illustrates an operation of receiving a message sent to a counterpart device by an upper layer and transmitting the message through a lower layer in a terminal according to an embodiment of the present disclosure.

Referring to FIG. 7, at step 710, the recovery module of the terminal may wait to receive a message sent to the counterpart device by the upper layer. According to an embodiment, the message may be, for example, an HTTP request message. In this disclosure, it is assumed that an HTTP message is used, but the present disclosure is not limited thereto.

Thereafter, according to an embodiment, the terminal may determine at step 715 whether the transmission of an optimistic ACK segment is possible.

For example, the terminal may check whether a current HTTP version is 1.1 or more. Namely, the terminal may determine whether the HTTP version supports the transmission of the optimistic ACK segment. In case of the HTTP version 1.1 or more, a retransmission request and retransmission for a data segment after any error-occurring data segment or for the error-occurring data segment are supportable. Therefore, the terminal may determine whether the transmission of the optimistic ACK segment is possible by determining whether the HTTP version is 1.1 or more.

In addition, the terminal may determine whether the HTTP request message is a GET method. The HTTP request message may use a GET method, a POST method, a HEAD method, a PUT method, or the like. In particular, the GET method corresponds to an operation in which the terminal (i.e., the TCP receiver) receives downlink data from the TCP sender. The terminal may use the transmission of the optimistic ACK segment so as to quickly enter the congestion avoidance state when receiving the downlink data. Accordingly, the terminal may determine whether the HTTP request message is the GET method, and thus determine whether to perform the optimistic ACK segment transmission operation.

Thereafter, if it is determined at step 715 that the transmission of the optimistic ACK segment is possible, the terminal may notify at step 717 the TCP layer that it is possible to transmit the optimistic ACK segment. On the other hand, if it is determined that the transmission of the optimistic ACK segment is not possible, the terminal may notify at step 719 the TCP layer that it is impossible to transmit the optimistic ACK segment.

According to an embodiment, if a message reception event occurs, the terminal may proceed to step 720 and create a new TCP session connection with the counterpart device. If there is a TCP session already connected with the counterpart device, step 720 may be omitted.

In addition, at step 730, the terminal may transmit the HTTP request message to the counterpart device by using the connected TCP session.

Then, at step 740, the terminal may wait to receive an HTTP response message to be sent by the counterpart device in response to the HTTP request message.

According to an embodiment, the operation of the terminal as shown in FIG. 7 may be performed by the enhanced TCP module of the terminal.

Figure 8:
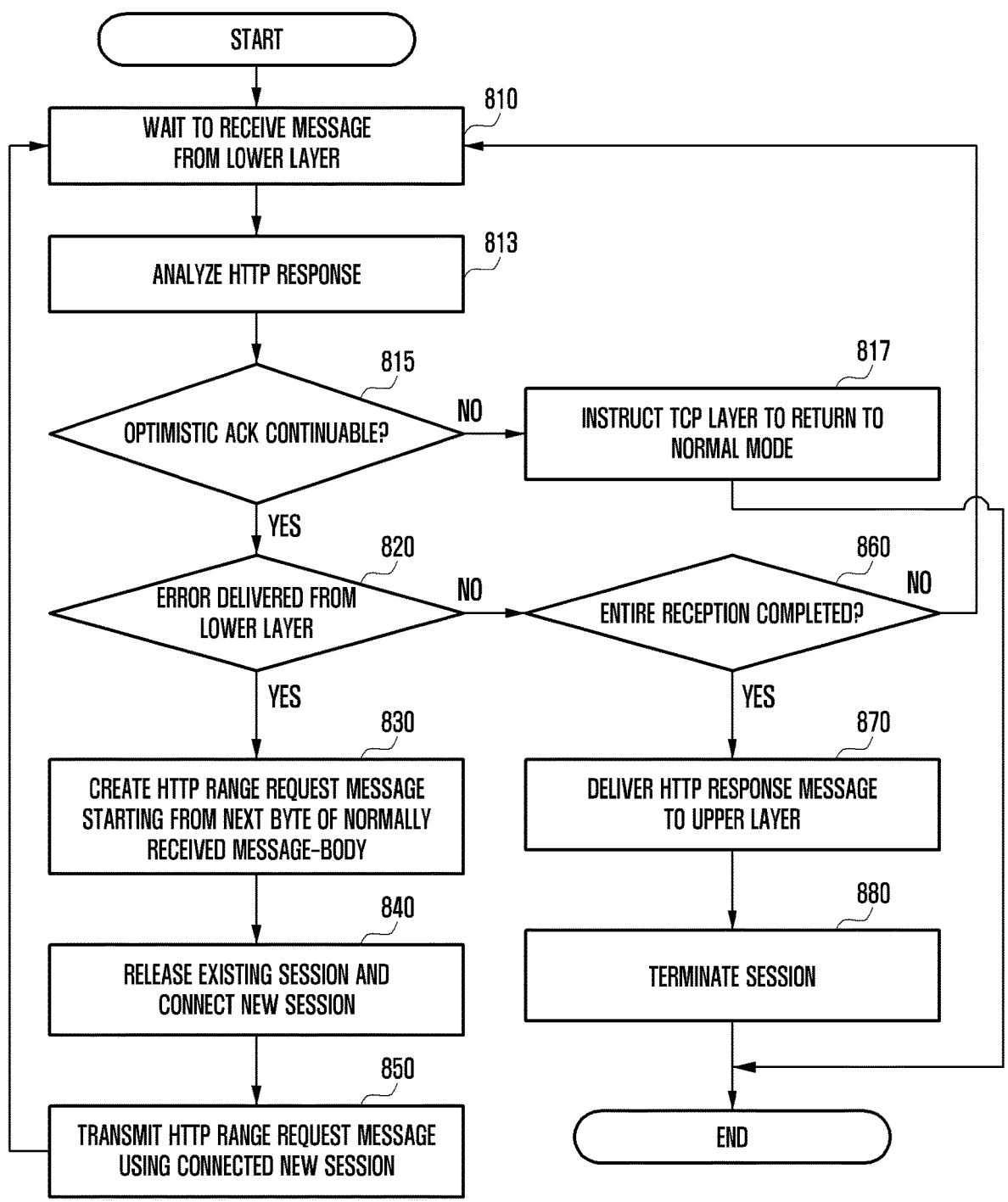
FIG. 8 illustrates an operation of receiving a message of a counterpart device from a lower layer and then delivering the message through an upper layer, or receiving an error from a lower layer and then performing recovery through retransmission in a terminal according to an embodiment of the present disclosure.

FIG. 8 illustrates an operation of receiving a message of a counterpart device from a lower layer and then delivering the message through an upper layer, or receiving an error from a lower layer and then performing recovery through retransmission in a terminal according to an embodiment of the present disclosure.

Referring to FIG. 8, at step 810, the recovery module of the terminal may wait to receive a message of the counterpart device from the lower layer. The message may be, for example, an HTTP response message or an error message indicating a transmission error of the lower layer.

According to an embodiment, if the HTTP response message is received, the terminal may analyze the HTTP response message at step 813. Then, by using the analysis result of the HTTP response message, the terminal may determine at step 815 whether the transmission of optimistic ACK segments can be continued.

For example, in order to determine at step 815 whether the transmission of optimistic ACK segments can be continued, the terminal may determine whether there is the Accept-Ranges header in the HTTP response message. The Accept-Ranges header may exist in the HTTP response message, such as "Accept-Ranges: bytes", and this may indicate that a retransmission request and retransmission for a data segment after any error-occurring data segment or for the error-occurring data segment are supportable. Therefore, if the Accept-Ranges header does not exist in the HTTP response message, the terminal may determine that the transmission of the optimistic ACK segment should be stopped.

In addition, according to another embodiment, the terminal may determine whether the Transfer-encoding header is designated as chunked. The Transfer-encoding header may exist in the HTTP response message, such as "Transfer-encoding: chunked", and this may indicate that the total size (length) of data is undecided. If the total size of data is undecided, the terminal may not request the retransmission of data segments after the error-occurring data segment, as described later. Therefore, if the Transfer-encoding header is designated as chunked, the terminal may determine that the transmission of the optimistic ACK segment should be stopped.

In addition, according to still another embodiment, the terminal may determine whether the Content-Length header value is absent or not valid. If the Content-Length header value is absent or invalid, the terminal may fail to know the total length of received data. In this case, the terminal may not request the retransmission of data segments after the error-occurring data segment, as described later. Therefore, if the Content-Length header value does not exist or is not valid, the terminal may determine that the transmission of the optimistic ACK segment should be stopped.

If it is determined at step 815 that the transmission of the optimistic ACK segment should be stopped, the terminal may instruct the TCP layer to return to the normal mode at step 817.

If it is determined that the transmission of the optimistic ACK segment can be continued, the recovery module of the terminal may check at step 820 whether an error message is delivered from the lower layer.

As described above, the error message may occur according to the expiration of the loss detect timer. In addition, the error message may include information about a lost data segment.

For example, if the sixth through tenth optimistic ACK segments are transmitted, but if the eighth data segment is not received until the loss detect timer expires, the error message may indicate that the eighth data segment is lost.

According to an embodiment, the loss detect timer may be driven for each optimistic ACK segment when the terminal transmits the optimistic ACK segments. In this case, if the corresponding data segment is not received until the expiration of each loss detect timer, the recovery module may receive the error message from the lower layer. At this time, the recovery module may receive error messages for respective individual loss-occurring data segment, or may receive one error message that includes information about loss-occurring data segments during one RTT round.

For example, when the terminal drives the sixth through tenth loss detect timers while transmitting the sixth through tenth optimistic ACK segments, the seventh and ninth data segments may not received until the seventh and ninth loss detect timers expire. In this case, the recovery module may receive, from the lower layer, the first error message including information indicating a loss of the seventh data segment and the second error message including information indicating a loss of the ninth data segment. Alternatively, the recovery module may receive from the lower layer one error message including information indicating that the seventh and ninth data segments are lost.

If it is determined at step 820 that the error message is received, the recovery module of the terminal may proceed to step 830 and create a retransmission request message that includes information for requesting the retransmission of the error-occurring data segment. In this case, the retransmission request message may be an HTTP range request message that starts from the next byte of a normally received message-body. For example, if an error message is received because of the loss of the eighth data segment among the sixth through tenth data segments, the terminal may create the HTTP range request message starting from the eighth data segment. In this case, the terminal may request the retransmission of the eighth through tenth data segments.

Alternatively, according to another embodiment, the recovery module of the terminal may create the retransmission request message that includes information for requesting the retransmission of only the error-occurring data segment. For example, if an error message is received because of the loss of the seventh and ninth data segments among the sixth through tenth data segments, the terminal may create the HTTP range request message that requests the retransmission of the seventh and ninth data segments.

In addition, according to an embodiment, the terminal may release the existing error-occurring session connection and create a new session connection at step 840. Alternatively, according to another embodiment, the terminal may perform a loss recovery operation using the existing session without releasing the connection thereof.

Thereafter, at step 850, the terminal may transmit the HTTP range request message created at step 830 to the counterpart device through the existing session or the new session created at step 840. Then the terminal may return to step 810 and wait for the HTTP response message to be sent by the counterpart device in response to the HTTP range request message.

Meanwhile, if the recovery module of the terminal receives a normal message, not an error, from the lower layer at step 820, the terminal may proceed to step 860 and check whether the entire message (HTTP response) is completely received.

If the reception of the entire message is completed, the recovery module of the terminal may deliver the entire HTTP response message to the upper layer at step 870. Then, at step 880, the terminal may terminate the session (in case of desiring to maintain the session for subsequent message processing, step 880 may be omitted).

On the other hand, if the entire reception is not completed (e.g., only a part of the HTTP response message is received) at step 860, the recovery module of the terminal may proceed again to step 810 and wait for the remaining message to be delivered from the lower layer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a terminal, the method comprising:
   receiving at least one data segment from a sender;
   transmitting at least one acknowledgment (ACK) segment corresponding to the at least one data segment to the sender;
   transmitting a predetermined number of optimistic ACK segments corresponding to data segments to be received to the sender,
      wherein the predetermined number of optimistic ACK segments is less than or equal to a number of data segments received in a current round trip time (RTT) round, and
      wherein the transmitting the predetermined number of optimistic ACK segments includes, in case of a slow start state, transmitting the predetermined number of the optimistic ACK segments to the sender at a first predetermined time; and
   transmitting a retransmission request message for a non-received data segment to the sender in case that at least one data segment among the data segments corresponding to the predetermined number of the optimistic ACK segments is not received within a second predetermined time,
      wherein the transmitting the predetermined number of optimistic ACK segments includes transmitting the predetermined number of the optimistic ACK segments to the sender at the first predetermined time in case that a number of data segments received in the current RTT round is greater than or equal to a sum of a number of data segments received in a previous RTT round and a number of ACK segments transmitted in the previous RTT round.

2. The method of claim 1, wherein the slow start state is a state in which a congestion window increases exponentially in each RTT round.

3. The method of claim 1, wherein the transmitting the predetermined number of optimistic ACK segments includes transmitting the predetermined number of the optimistic ACK segments to the sender at the first predetermined time in case that an elapsed time of the current RTT round is smaller than a minimum one-way delay time.

4. The method of claim 1, further comprising:
   driving a loss detect timer in case that the data segments corresponding to the predetermined number of the optimistic ACK segments are not received in sequence; and
   transmitting to the sender a retransmission request message starting from a next data segment of normally received data segments in case that the data segments corresponding to the predetermined number of the optimistic ACK segments are not received in sequence until the loss detect timer expires.

5. A terminal comprising:
   a communication unit; and
   a controller configured to:
   control the communication unit to receive at least one data segment from a sender,
   control the communication unit to transmit at least one acknowledgment (ACK) segment corresponding to the at least one data segment to the sender,
   control the communication unit to transmit a predetermined number of optimistic ACK segments corresponding to data segments to be received to the sender,
      wherein the predetermined number of optimistic ACK segments is less than or equal to a number of data segments received in a current round trip time (RTT) round,
   control the communication unit to transmit, in case of a slow start state, the predetermined number of the optimistic ACK segments to the sender at a first predetermined time, and control the communication unit to transmit a retransmission request message for a non-received data segment to the sender in case that at least one data segment among the data segments corresponding to the predetermined number of the optimistic ACK segments is not received within a second predetermined time, wherein the controller is further configured to control the communication unit to transmit the predetermined number of the optimistic ACK segments to the sender at the first predetermined time in case that a number of data segments received in the current RTT round is greater than or equal to a sum of a number of data segments received in a previous RTT round and a number of ACK segments transmitted in the previous RTT round.

6. The terminal of claim 5, wherein the slow start state is a state in which a congestion window increases exponentially in each RTT round.

7. The terminal of claim 5, wherein the controller is further configured to control the communication unit to transmit the predetermined number of the optimistic ACK segments to the sender at the first predetermined time in case that an elapsed time of the current RTT round is smaller than a minimum one-way delay time.

8. The terminal of claim 5, wherein the controller is further configured to drive a loss detect timer in case that the data segments corresponding to the predetermined number of the optimistic ACK segments are not received in sequence, and to control the communication unit to transmit a retransmission request message to the sender in case that the data segments corresponding to the predetermined number of the optimistic ACK segments are not received in sequence until the loss detect timer expires, wherein the retransmission request message starts from a next data segment of normally received data segments.

9. A communication method of a terminal, the method comprising:

receiving at least one data segment from a sender;

transmitting at least one acknowledgment (ACK) segment corresponding to the at least one data segment to the sender;

transmitting a predetermined number of optimistic ACK segments corresponding to data segments to be received to the sender at a first predetermined time, wherein the predetermined number of optimistic ACK segments is less than or equal to a number of data segments received in a current round trip time (RTT) round, and wherein the transmitting the predetermined number of optimistic ACK segments includes, in case of a slow start state, transmitting the predetermined number of the optimistic ACK segments to the sender at the first predetermined time; and transmitting a retransmission request message for a non-received data segment to the sender in case that at least one data segment among the data segments corresponding to the predetermined number of the optimistic ACK segments is not received within a second predetermined time, wherein the transmitting the predetermined number of optimistic ACK segments includes transmitting the predetermined number of the optimistic ACK segments to the sender when a number of data segments received in the current RTT round is greater than or equal to a sum of a number of data segments received in a previous RTT round and a number of ACK segments transmitted in the previous RTT round.

10. The method of claim 9, wherein the slow start state is a state in which a congestion window increases exponentially in each RTT round.

11. The method of claim 9, further comprising:

driving a loss detect timer in case that the data segments corresponding to the predetermined number of the optimistic ACK segments are not received in sequence; and transmitting to the sender a retransmission request message starting from a next data segment of normally received data segments in case that the data segments corresponding to the predetermined number of the optimistic ACK segments are not received in sequence until the loss detect timer expires.

12. The method of claim 9, wherein the transmitting the predetermined number of optimistic ACK segments includes transmitting the predetermined number of the optimistic ACK segments to the sender when an elapsed time of the current RTT round is smaller than a minimum one-way delay time.

* * * * *